June 25, 1974  E. J. MAROSCHAK  3,819,778
METHOD OF MAKING AND PROCESSING CORRUGATED PLASTIC PIPE
Filed June 13, 1972  2 Sheets-Sheet 1
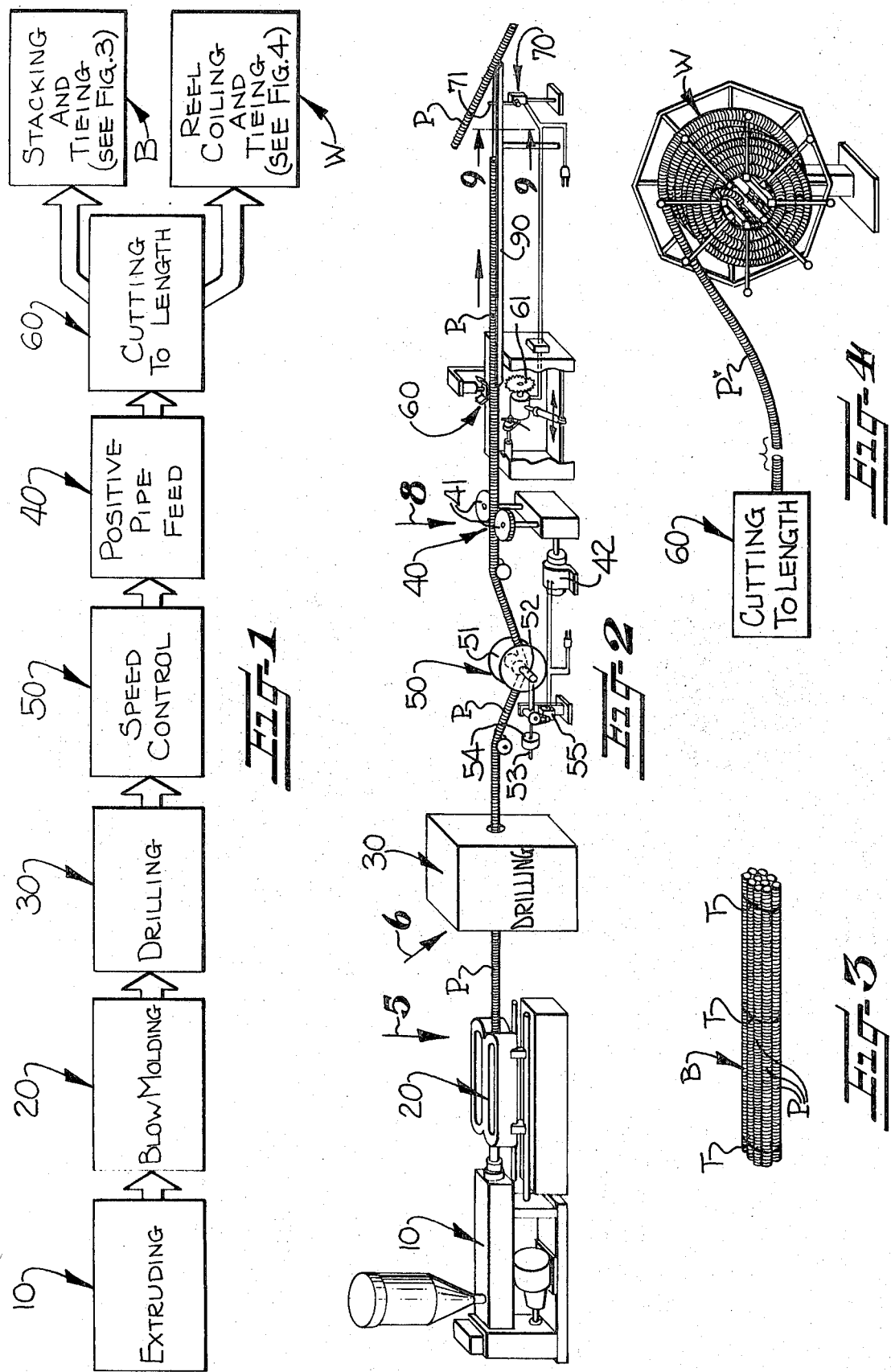

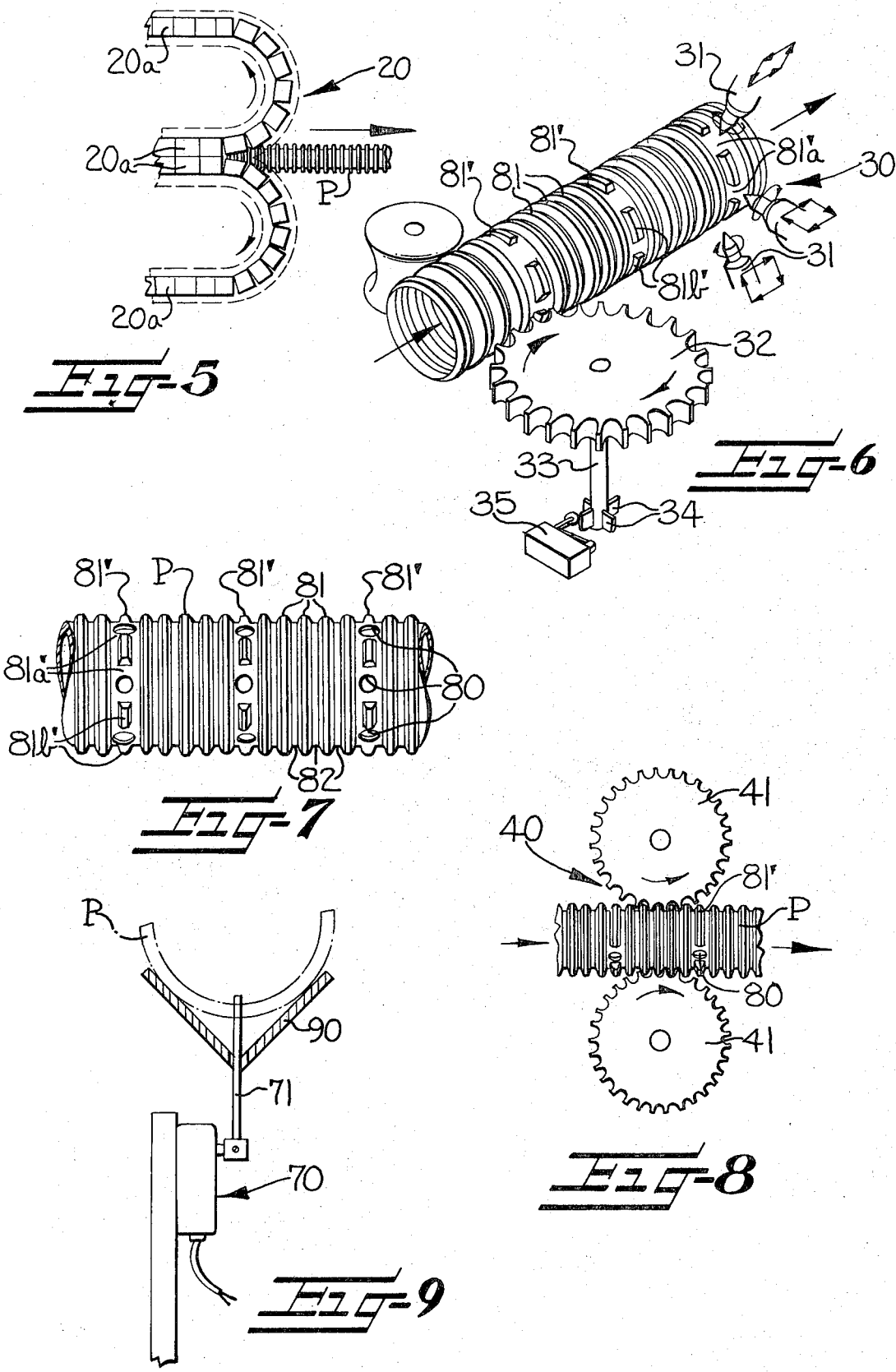

United States Patent Office

3,819,778
Patented June 25, 1974

3,819,778
METHOD OF MAKING AND PROCESSING CORRUGATED PLASTIC PIPE
Ernest J. Maroschak, Roseboro, N.C., assignor to Plastic Tubing, Inc., Roseboro, N.C.
Filed June 13, 1972, Ser. No. 262,192
Int. Cl. B29c 17/07, 17/10, 17/15
U.S. Cl. 264—40                                    12 Claims

ABSTRACT OF THE DISCLOSURE

A method of making plastic corrugated pipe which includes the steps of extruding a hot plastic material into a blow molding zone defined by a series of cooperating pairs of moving die blocks to form a pipe having annular corrugations of alternating ribs and valleys thereon during forward movement of the pipe through the blow molding zone, delivering the corrugated pipe from the blow molding zone at a predetermined speed, feeding the corrugated pipe delivered from the blow molding zone successively through drilling and cutting stations by meshingly engaging corrugations of the pipe with a plurality of forwardly moving teeth with successive teeth entering successive valleys and pushing forwardly against the successive ribs of the corrugated pipe, drilling holes in the pipe as it passes through the drilling station, cutting the drilled pipe into predetermined lengths as it passes through the cutting station, and sensing variations in tension in the corrugated pipe being fed and in response thereto varying the rate of movement of the forwardly moving teeth to compensatively vary the rate of feed of the pipe to substantially accord with the rate of delivery of the pipe from the blow molding zone to avoid undesirable stretching or longitudinal compression of the pipe and to thereby obtain a pipe with a substantially uniform number of ribs and valley portions per unit of length thereof.

---

This invention relates to a method of making plastic corrugated pipe utilizing an extruding machine which feeds a hot plastic material into a blow molding machine having a blow molding zone defined by a series of cooperating pairs of moving die blocks which shape the plastic material to form a pipe with annular corrugations of alternating ribs and valleys during forward movement of the pipe through the blow molding zone, and wherein the corrugated pipe is delivered from the molding zone at a predetermined speed and is thereafter passed through one or more stations such as for the drilling of holes in the pipe and the cutting of the pipe into predetermined lengths for thereafter forming a stacked bundle of pipes or a wound package of pipe.

More particularly, this invention relates to the manner in which the pipe delivered from the blow molding zone is thereafter positively fed so as to be properly presented at the various work stations while avoiding undue stretching or longitudinal compression of the pipe, to permit obtaining a pipe with a substantially uniform number of ribs and valley portions per unit of length thereof.

With the foregoing in mind, it is the primary object of this invention to provide an improved method of positively feeding pipe after being delivered from a blow molding machine at a predetermined rate, while sensing variations in tension in the corrugated pipe being fed through one or more work stations, and in response thereto compensatively varying the rate of feed of the pipe to substantially accord with the rate of delivery of the pipe from the blow molding machine, to obtain a pipe with a substantially uniform number of ribs and valley portions per unit length thereof.

It is a more specific object of this invention to provide a method of positively feeding corrugated pipe by meshingly engaging the corrugations of the pipe with a plurality of forwardly moving teeth with successive teeth entering successive valleys of the pipe and pushing forwardly against the respective ribs of the corrugated pipe, such feeding serving to move the pipe through one or more work stations with the speed of feed being correlated with the delivery rate of the pipe emanating from the blow molding machine, and wherein at one work station a series of holes are drilled in the pipe with the holes being arcuately arranged around the pipe and at predetermined spaced locations along the length of the pipe, and wherein a predetermined number of ribs on the pipe are sensed and in response thereto the drilling of the holes is performed, with the drilled pipe subsequently being cut into predetermined lengths and formed into a stacked bundle of pipes or coiled into a wound package of pipe.

Some of the objects of the invention having been stated, other objects will appear as the description proceeds when taken in connection with the accompanying drawings, in which:

FIG. 1 is a block diagram of the method of making and processing corrugated plastic pipe in accordance with this invention;

FIG. 2 is a schematic view of the processing steps of this invention;

FIG. 3 is a perspective view of a tied bundle of corrugated pipes formed in accordance with this invention;

FIG. 4 is a schematic view of the coiling of the corrugated pipe into a wound package;

FIG. 5 is a fragmentary top plan view looking in the direction of arrow 5 of FIG. 2 and illustrating the corrugated plastic pipe being delivered from the blow molding machine;

FIG. 6 is a schematic view looking in the direction of arrow 6 of FIG. 2 and illustrating the drilling station in which the ribs on the corrugated pipe are counted for controlling and indexing the operation of the drills;

FIG. 7 is a bottom plan view of the corrugated plastic pipe formed in accordance with this invention;

FIG. 8 is a top plan view looking in the direction of arrow 8 of FIG. 2 and illustrating the positive feed of the corrugated pipe by the meshing relation of a pair of feed gears with the ribs of the pipe; and FIG. 9 is a vertical sectional view taken along line 9—9 of FIG. 2 and illustrating the control switch for actuating the pipe cutting machine in response to engagement of the switch by the leading end of the pipe.

Referring more particularly to the drawings, especially FIG. 2, reference numeral 10 designates an extruding machine shown arranged to feed a hot plastic material to a blow molding machine, broadly indicated at 20. As is well known, a blow molding machine for successively forming pipe of the corrugated type has a blow molding zone in the medial portion thereof which receives the hot plastic material from the extruding machine, with the molding zone being defined by a series of cooperating pairs of moving die blocks 20a (FIG. 5) which die blocks, are internally configured in accordance with the desired corrugated configuration to be imparted to the pipe, all as is well known in the art. Also, as is known, the moving die blocks 20a deliver the corrugated plastic pipe P forwardly at a predetermined speed.

As illustrated in FIG. 2, the corrugated pipe being delivered from the blow molding machine is directed through a drilling station 30, which is illustrated in greater detail in FIG. 6, and downstream of the drilling station there is provided a positive pipe feed 40. The rate of feed of the positive pipe feed 40 is controlled by a pipe tension sensing device 50, which is positioned upstream toward the drilling station. Positioned downstream from the positive pipe feed 40 is a pipe cutting station 60 which is actuated under the control of a sensing switch 70. Switch 70 is responsive to engagement thereof by the leading end of the corrugated pipe P to actuate cutting station 60.

If it is desired to form uniform cut lengths of pipe, such as 10 foot lengths, for ease in handling such cut lengths it is desirable to nestingly stack the same and form a bundle B with a plurality of tie strings T therearound, as illustrated in FIG. 3. On the other hand, if the customer desires a relatively long length of pipe, such as 250 feet, it is desirable for ease in handling the pipe to coil the same into a wound package W, as illustrated in FIG. 4. In this instance, the sensing switch 70, which normally controls actuation of the cutter in the pipe cutting station 60 is immobilized and instead a conventional type of surface counter (not illustrated) is electrically connected to the pipe cutter and placed in engagement with the moving surface of the pipe P for obtaining the desired footage, for example 250 feet, prior to actuating the pipe cutting station. In this event, it will be understood that the terminal end P' of the pipe (FIG. 4) to be coiled will then be free to be wound onto the reel to complete the wound package W.

Referring now more particularly to the drilling station 30, as best illustrated in FIG. 6, the drilling station comprises a bank of three rotating drills 31 each of which has a parallelogram type of movement, i.e., each of the drills is moved from an initial inactive position spaced from the periphery of the pipe, into drilling engagement with the pipe, then moved in the direction of the moving pipe, and then withdrawn from the pipe and returned to the inactive starting position. This movement of the respective drills 31 assures the forming of round drainage holes 80 in the pipe P, as best illustrated in FIG. 7 with the holes preferably being of a diameter greater than the width of the ribs but less than the collective width of a rib and two valleys. At this point, it should be understood that the cooperating pairs of die blocks 20a in the blow molding machine 20 are internally configured to form a corrugated pipe of the type shown in FIG. 7, wherein successively arranged ribs 81 are provided with interconnecting valley portions 82 therebetween and wherein every sixth rib is in the form of an interrupted rib 81' by the forming of three recesses 81a' therein. The holes 80 are drilled in the recesses 81a', with the three holes in each interrupted rib 81' thus being arranged in an arcuate series and positioned between segmental rib portions 81b'. Thus, the series of drainage holes 80 are positioned at locations inwardly from the periphery of the pipe P to be shieldingly protected by the segmental ribs 81b' when the pipe is properly installed in the ground with the holes 80 being positioned lowermost for effecting proper drainage, as for example, when the pipe is used for a septic tank field.

As noted, the drainage holes 80 are to be drilled in the interrupting recesses 81a' of the interrupted ribs 81'. To assure that the holes will be properly drilled in these recessed areas, the drilling station 30 (FIG. 6) includes a freely rotatable timing wheel 32 carried by an upright shaft 33 having a plurality of control cams 34 on its lower end. As illustrated, the timing wheel 32 meshes with the ribs of the pipe and has twenty-four teeth corresponding to twenty-four ribs on the pipe P. Also, it will be noted that there are four control cams 34 provided for successively actuating a drill switch 35 which is electrically connected to the drills 31. Thus, upon rotation of the timing wheel 32 by the ribs of the pipe P being fed, and upon six teeth of the timing wheel 32 being successively engaged with the ribs of the pipe P, one of the cams 34 will actuate the drill switch 35 to, in turn, actuate the drills 31. Thus, it is apparent that the timing wheel 32, as illustrated, will actuate the drills 31 four successive times during one revolution of the timing wheel 32. At this point, it might help one's understanding to realize that the center of each interrupted rib 81' is positioned approximately four inches from the center of the next adjacent interrupted rib 81'. Thus, one revolution of the timing wheel 32 accommodates approximately one linear foot of the pipe P and effects drilling of four successive series of drainage holes 80 therein.

Referring now to the positive pipe feed 40 and its speed control 50, it will be noted that the positive pipe feed 40 is illustrated in the form of a pair of spaced feed gears 41 which are diametrically opposed relative to the pipe P and meshingly engage the ribs along opposite sides of the pipe P. A motor 42, preferably of the DC type, is provided for imparting rotation to the pipe feed gears 41. In view of the pipe P normally being in heated condition and not entirely cool at this point in the process, it is desirable to avoid stretching the pipe lengthwise as well as to avoid compressive shortening of the pipe. To avoid these conditions, it is desirable to synchronize the speed of the feed gears 41 with the delivery rate of the corrugated pipe coming from the blow molding machine 20. This permits obtaining a final pipe product having a substantially uniform number of ribs and valley portions per unit of length thereof.

Referring now to the speed control tension device 50, as illustrated, the same comprises a pulley 51 engaging the pipe P and mounted for free rotation on a shaft 52 which, in turn, is carried by one end of a pivotally mounted counterbalance arm 53. Arm 53 has an adjustably mounted counterbalance weight 54 on the other end thereof. A potentiometer 55 electrically connected to the motor 42, is positioned below and operatively connected to the counterbalance arm 53 so that the potentiometer is varied in accordance with the position of the counterbalance arm 53, i.e., in the event the tension in the pipe P increases, this results in lifting of the pulley 51 to reduce the speed of the motor 42 and decrease the speed of the pipe feed gears 41. On the other hand, if the pipe P becomes unduly slack and the tension therein drops down to thus cause the pulley 51 to move lower, the potentiometer 55 will increase the speed of the motor 42 and thus increase the rate of speed of the pipe feed gears 41.

Referring now to the pipe cutting station 60, it includes a motorized saw 61 actuated under control of sensing switch 70 positioned downstream therefrom. The sensing switch 70 has a switch sensing arm 71 (FIG. 9) which protrudes upwardly through a pipe guide through 90 into the path of travel of the leading end of the pipe P. Upon the leading end of the pipe engaging the switch sensing arm 71, the switch 70 will be closed to actuate the motorized saw 61. As is conventional, the motorized saw 61 is mounted for movement with the pipe during the cutting operation and upon the cutting being completed, the saw is reciprocated upstream to its original location, ready for the next cutting operation.

It will thus be understood from the foregoing description that an improved method of making and processing corrugated plastic pipe has been disclosed to facilitate obtaining a final corrugated pipe product of uniform quality per unit length thereof.

In the drawings and specification there has been set forth a preferred embodiment of the invention and, although specific terms are employed, they are used in a generic and descriptive sense only and not for purposes of limitation.

That which is claimed is:

1. A method of making plastic corrugated pipe which comprises the steps of extruding a hot plastic material into a blow molding zone defined by a series of cooperating pairs of moving die blocks to form a pipe while molding anular corrugations of alternating ribs and valleys on the pipe during forward movement of the pipe through the blow molding zone and while delivering the corrugated pipe from the molding zone at a predetermined speed, feeding the corrugated pipe delivered from the blow molding zone through a cutting station by meshingly engaging the corrugations of the pipe with a plurality of forwardly moving teeth with successive teeth entering successive valleys and pushing forwardly against the respective ribs of the corrugated pipe, sensing variations in tension in the corrugated pipe between the blow molding zone and said feeding and in response thereto varying the rate of movement of the forwardly moving teeth to compensatively vary the rate of the feed of the pipe to substantially accord with the rate of delivery of the pipe from the blow molding zone, and cutting into predetermined lengths the pipe being fed as it passes through the cutting station.

2. A method according to Claim 1 wherein the cutting of the pipe into predetermined lengths includes successively cutting a plurality of uniform length pipes, and further including stacking the uniform length pipees in nesting relation and tieing them in a bundle.

3. A method according to claim 1, including winding a predetermined length of the corrugated pipe being fed onto a rotating reel, then effecting said cutting of the pipe at the cutting station, and then winding the cut terminal portion of the pipe onto the reel to form a wound package of pipe.

4. A method of making plastic corrugated pipe which comprises the steps of extruding a hot plastic material into a blow molding zone defined by a series of cooperating pairs of moving die blocks to form a pipe while molding annular corrugations of alternating ribs and valleys on the pipe during forward movement of the pipe through the blow molding zone and while delivering the corrugated pipe from the molding zone at a predetermined speed, feeding the corrugated pipe delivered from the blow molding zone successively through drilling and cutting stations by meshingly engaging the corrugations of the pipe with a plurality of forwardly moving teeth with successive teeth entering successive valleys and pushing forwardly against the respective ribs of the corrugtaed pipe, drilling holes in the pipe as it passes through the drilling station, sensing variations in tension in the corrugated pipe between the blow molding zone and said feeding and in response thereto varying the rate of movement of the forwardly moving teeth to compensatively vary the rate of the feed of the pipe to substantially accord with the rate of delivery of the pipe from the blow molding zone, and cutting the pipe into predetermined lengths as it passes through the cutting station.

5. A method according to claim 4, wherein the drilling of holes in the pipe as it passes through the drilling station includes drilling a series of holes arcuately arranged around the pipe at predetermined spaced locations along the length of the pipe.

6. A method according to claim 5, wherein the drilling of the arcuately arranged series of holes includes moving a corresponding number of ratating drills into drilling engagement with and through the pipe as it is being fed forwardly.

7. A method according to Claim 4, which includes sensing a predetermined number of ribs on the pipe, and in response thereto, drilling the holes in the pipe at the drilling station.

8. A method according to claim 4, wherein certain ribs of the corrugated pipe are blow molded with interrupting recesses formed in the ribs and wherein the drilling of holes in the pipe as it passes through the drilling station includes drilling the holes through the interrupting recesses in the ribs so the holes are located inwardly from the peiphery of the pipe.

9. A method according to claim 8, wherein the drilling of the holes through the interrupting recesses formed in certain ribs includes forming holes of a diameter greater than the width of the ribs but less than the collective width of a rib and two valleys.

10. A method of making plastic corrugated pipe which comprises the steps of extruding a hot plastic material into a blow molding zone defined by a series of cooperating pairs of moving die blocks to form a pipe, while molding annular corrugations of alternating ribs and valleys on the pipe with certain ribs being formed with interrupting recesses therein during forward movement of the pipe through the blow molding zone and while delivering the corrugated pipe from the molding zone at a predetermined speed, feeding the corrugated pipe delivered from the blow molding zone successively through drilling and cutting stations by meshingly engaging corrugations of the pipe with a plurality of forwardly moving teeth with successive teeth entering successive valleys and pushing forwardly against the successive ribs of the corrugated pipe, sensing variations in tension in the corrugated pipe between the blow molding zone and said feeding and in response thereto varying the rate of movement of the forwardly moving teeth to compensatively vary the rate of feed of the pipe to substantially accord with the rate of delivery of the pipe from the blow molding zone, drilling holes in the interrupting recesses formed in certain of the ribs of the pipe as it passes through the drilling station, and cutting the pipe into predetermined lengths as it passes through the cutting station.

11. A method according to claim 10, which includes sensing a predetermined number of ribs on the pipe, and in response thereto, drilling the holes in the pipe at the drilling station.

12. A method according to claim 10, wherein the drilling of the holes through the interrupting recesses formed in certain ribs includes forming holes of a diameter greater than the width of the ribs but less than the collective width of a rib and two valleys.

References Cited

UNITED STATES PATENTS

| 3,732,046 | 5/1973 | Martin | 264—40 X |
| 3,329,998 | 7/1967 | Stohr | 264—209 X |
| 2,777,160 | 1/1957 | Rulison et al. | 264—40 |
| 3,395,200 | 7/1968 | Mader, Jr., et al. | 264—40 |
| 3,183,571 | 5/1965 | Schmunk et al. | 264—156 X |
| 2,649,618 | 8/1953 | Rhodes et al. | 264—40 |
| 2,930,102 | 3/1960 | Hitchin et al. | 264—40 UX |
| 2,963,750 | 12/1960 | Pavlic | 264—DIG 052 |
| 3,538,209 | 11/1970 | Helger | 264—90 |
| 3,577,495 | 5/1971 | Pearl et al. | 264—156 X |
| 3,620,115 | 11/1971 | Zieg et al. | |

JAN H. SILBAUGH, Primary Examiner

U.S. Cl. X.R.

264—99, 151, 156, 209, 238 DIG. 052; 425—142, 296 303, 326 B, 336, DIG. 203 C

UNITED STATES PATENT OFFICE
CERTIFICATE OF CORRECTION

Patent No. 3,819,778          Dated June 25, 1974

Inventor(s) Ernest J. Maroschak

It is certified that error appears in the above-identified patent and that said Letters Patent are hereby corrected as shown below:

Column 1, line 49, after "more" insert -- work --. Column 3, line 60, "Alsc" should read -- Also --. Column 4, line 42, "through", second occurrence, should read -- trough --; line 66, "anular" should read -- annular --. Column 5, line 12, "pipees" should read -- pipes --; line 50, "ratating" should read -- rotating --. Column 6, line 2, "peiphery" should read -- periphery --.

Signed and sealed this 24th day of September 1974.

(SEAL)
Attest:

McCOY M. GIBSON JR.
Attesting Officer

C. MARSHALL DANN
Commissioner of Patents